United States Patent
Scott et al.

(10) Patent No.: US 9,828,266 B2
(45) Date of Patent: Nov. 28, 2017

(54) SYSTEMS AND METHODS FOR STERILIZING LIQUID MEDIA

(71) Applicant: Algenol Biofuels Inc., Fort Myers, FL (US)

(72) Inventors: Brendan Bodhi Scott, Fort Myers, FL (US); Jason Keith Ward, Estero, FL (US); Jesse Diego Phillips-Kress, Fort Myers, FL (US); Cyrus Nima Rashedi, Estero, FL (US); Alexander James Franke, Saint James City, FL (US)

(73) Assignee: Algenol Biotech LLC, Fort Myers, FL (US)

( * ) Notice: Subject to any disclaimer, the term of this patent is extended or adjusted under 35 U.S.C. 154(b) by 538 days.

(21) Appl. No.: 14/470,579

(22) Filed: Aug. 27, 2014

(65) Prior Publication Data

US 2016/0060149 A1 Mar. 3, 2016

(51) Int. Cl.
*C02F 1/44* (2006.01)
*C02F 1/78* (2006.01)
*C02F 3/32* (2006.01)
*C02F 9/00* (2006.01)

(52) U.S. Cl.
CPC .................. *C02F 1/78* (2013.01); *C02F 9/00* (2013.01); *C02F 1/444* (2013.01); *C02F 3/322* (2013.01); *C02F 2201/784* (2013.01); *C02F 2209/40* (2013.01); *C02F 2303/04* (2013.01)

(58) Field of Classification Search
CPC .... C02F 1/444; C02F 1/78; C02F 9/00; C02F 3/322; C02F 2201/784; C02F 2303/04
See application file for complete search history.

(56) References Cited

U.S. PATENT DOCUMENTS

| | | |
|---|---|---|
| 3,459,528 A | 8/1969 | Wiesboeck et al. |
| 5,059,317 A * | 10/1991 | Marius ............ C02F 9/00 210/202 |
| 5,151,250 A | 9/1992 | Conrad |
| 5,250,177 A | 10/1993 | Cho |
| 5,264,136 A | 11/1993 | Howarth et al. |
| 5,888,428 A | 3/1999 | Howarth et al. |
| 6,986,323 B2 | 1/2006 | Ayers |
| 7,052,601 B2 | 5/2006 | Gravdal |
| 2004/0061069 A1 | 4/2004 | Schalble et al. |
| 2004/0129645 A1 | 7/2004 | Perlich et al. |
| 2004/0226893 A1 | 11/2004 | Kamimura et al. |
| 2005/0155539 A1 | 7/2005 | Randall |
| 2007/0136834 A1 | 6/2007 | Greenbaum et al. |

(Continued)

FOREIGN PATENT DOCUMENTS

| | | |
|---|---|---|
| WO | WO/03/106350 | 12/2003 |
| WO | WO/2008/037324 | 4/2008 |
| WO | WO/2014/124357 | 8/2014 |

OTHER PUBLICATIONS

Det Norske Veritas, "Technical Report, Barber Ship Management, Ballast Water Treatment by Ozonation—Corrosion", Report No. 2001-0522, Rev. No. 1, 2001.

(Continued)

*Primary Examiner* — Lucas Stelling
(74) *Attorney, Agent, or Firm* — David J. Lorenz; Suzanne G. Jepson

(57) ABSTRACT

Systems and methods for sterilizing liquid media such as saline water using filtration and ozonation.

5 Claims, 3 Drawing Sheets

(56) References Cited

U.S. PATENT DOCUMENTS

2008/0035580 A1 2/2008 De Rijk
2010/0116647 A1 5/2010 Kornmuller et al.
2011/0250604 A1 10/2011 Cane et al.
2012/0312757 A1 12/2012 Ueyama et al.

OTHER PUBLICATIONS

Nielsen, "Control of Ballast Water Organisms with a Seawater Electrochlorination and Filtration System", a thesis submitted in partial fulfillment of the requirements for the degree of Master of Science, University of Washington, 2006.
Oemcke, "The treatment of ships' ballast water", EcoPorts Monograph Series No. 18 (Ports Corporation of Queensland, Brisbane), 1999, 102 pp.
Perrins, et al., "Ozonation of seawater from different locations: Formation and decay of total residual oxidant-implications for ballast water treatment", Mar. Pollut. Bull. Sep. 2006; 52(9):1023-33; epub Mar. 15, 2006.
Sciotino, et al., "Fishery Harbour Manual on the Prevention of Pollution—Bay of Bengal Programme", BOBP/MAG/22, Madras, India, 1999.

\* cited by examiner

SYSTEMS AND METHODS FOR STERILIZING LIQUID MEDIA

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO SEQUENCE LISTING, A TABLE, OR A COMPUTER PROGRAM LISTING COMPACT DISC APPENDIX

Not applicable.

BACKGROUND

Genetically enhanced microorganisms that make ethanol or other biofuels through photosynthesis can be cultivated in photobioreactors, in which cultures of the microorganisms are provided with carbon dioxide and sunlight. Operation of a photobioreactor entails inoculating the photobioreactor with microorganisms in liquid media, such as saline water or fresh water, to which nutrients and other growth agents are added.

Access to saline water typically is more prevalent and less expensive than access to fresh water. To minimize cost, a supply of saline water may be sourced, for example, from seawater or from groundwater drawn from a saline aquifer.

Water drawn from uncontrolled sources such as seawater or groundwater may contain microorganisms that are undesirable for placement within a closed photobioreactor. Undesirable microorganisms include fungi, bacteria, viruses, spore forms and other microorganisms that, if added to a culture in a photobioreactor, may outcompete the genetically enhanced microorganisms in the culture and/or consume product made by the genetically enhanced microorganisms.

Various approaches to treating water are the subject of, for example, WO/2014/124357; U.S. Pat. App. Pub. No. 2010/0116647; WO/2008/037324; U.S. Pat. App. Pub. No. 2004/0129645; U.S. Pat. App. Pub. No. 2008/0035580; U.S. Pat. App. Pub. No. 2004/0061069; U.S. Pat. App. Pub. No. 2007/0136834; U.S. Pat. App. Pub. No. 2012/0312757; U.S. Pat. App. Pub. No. 2004/0226893; U.S. Pat. App. Pub. No. 2005/0155539; WO/2003/106350; U.S. Pat. App. Pub. No. 2011/0250604; U.S. Pat. No. 5,264,136; U.S. Pat. No. 5,888,428; U.S. Pat. No. 7,052,601; U.S. Pat. No. 6,986,323; U.S. Pat. No. 5,250,177; U.S. Pat. No. 5,151,250; U.S. Pat. No. 3,459,528; Perrins et al., "Ozonation of seawater from different locations: formation and decay of total residual oxidant—implications for ballast water treatment", *Mar. Pollut. Bull.* 2006 September; 52(9):1023-33; epub 2006 Mar. 15; Nielsen, "Control of Ballast Water Organisms with a Seawater Electrochlorination and Filtration System", a thesis submitted in partial fulfillment of the requirements for the degree of Master of Science, University of Washington 2006; Oemcke, "The treatment of ships' ballast water", EcoPorts Monograph Series No. 18 (Ports Corporation of Queensland, Brisbane), 1999, 102 pp.; Det Norske Veritas, "Technical Report, Barber Ship Management, Ballast Water Treatment By Ozonation—Corrosion", Report No. 2001-0522, Rev. No. 1, 2001; and Sciortino et al., "Fishery Harbour Manual on the Prevention of Pollution—Bay of Bengal Programme", BOBP/MAG/22, Madras, India 1999.

A need exists for a system and method of neutralizing and removing microorganisms from water drawn from uncontrolled sources to a degree that is satisfactory for use with cultures of genetically enhanced microorganisms in closed photobioreactors. Treating water for this purpose using on-demand production of sterilizing agents, thereby avoiding on-site storage of potentially toxic chemicals, is also advantageous.

SUMMARY

An object of the present invention is a system for sterilizing a liquid medium such as saline water.

An aspect of this invention is directed to a system comprising at least one first filter capable of filtering the liquid medium; at least one ozone generator capable of adding ozone to the liquid medium; and connections providing fluid communication between the at least one first filter and the at least one ozone generator, wherein the at least one ozone generator is downstream from the at least one first filter.

An additional aspect of this invention is directed to a system further comprising at least one second filter capable of filtering the liquid medium; at least one flow control device; at least one receptacle; and connections providing fluid communication among the at least one first filter, the at least one second filter, the at least one ozone generator, the at least one flow control device and the at least one receptacle, wherein the at least one second filter is downstream from the at least one first filter, the at least one ozone generator is downstream from the at least one second filter, the at least one flow control device is downstream from the at least one ozone generator and the at least one receptacle is downstream from the at least one flow control device.

An additional aspect of this invention is directed to a system wherein the at least one receptacle is a photobioreactor.

An additional aspect of this invention is directed to a system wherein the liquid medium is saline water.

An additional aspect of this invention is directed to a system wherein the at least one first filter is a microfilter and the at least one second filter is an ultrafilter.

An additional aspect of this invention is directed to a system further comprising at least one Venturi injector configured to inject ozone from the at least one ozone generator into the liquid medium; and connections providing fluid communication among the at least one first filter, the at least one second filter, the at least one ozone generator, the at least one flow control device, the at least one receptacle and the at least one Venturi injector, wherein the at least one Venturi injector is downstream from the at least one second filter.

An additional aspect of this invention is directed to a system further comprising at least one tank capable of receiving liquid medium from at least one of the at least one first filter, the at least one second filter and the at least one flow control device; and connections providing fluid communication among the at least one first filter, the at least one second filter, the at least one ozone generator, the at least one flow control device, the at least one receptacle, the at least one Venturi injector and the at least one tank.

An additional aspect of this invention is directed to a system wherein the at least one tank receives liquid medium from the at least one flow control device, further comprising at least one ozone destruct device capable of receiving gas from the at least one tank; and connections providing fluid communication among the at least one first filter, the at least one second filter, the at least one ozone generator, the at least one flow control device, the at least one receptacle, the at least one Venturi injector, the at least one tank and the at least one ozone destruct device.

An additional aspect of this invention is directed to a system further comprising at least one third filter configured to filter gas received from the at least one tank, wherein the at least one ozone destruct device is downstream from the at least one third filter.

An additional aspect of this invention is directed to a system comprising at least one receiving tank comprising an input for saline water and further comprising at least one output; at least one microfilter comprising an input for saline water received from the at least one receiving tank and further comprising at least one output; at least one surge tank comprising an input for saline water received from the at least one microfilter and further comprising at least one output; at least one ultrafilter comprising an input for saline water received from the at least one surge tank and further comprising at least one output; at least one supply tank comprising an input for saline water received from the at least one ultrafilter and further comprising at least one output; at least one flow control device comprising an input for saline water received from the at least one supply tank and further comprising at least one output, wherein the at least one output comprises at least one output of saline water to the at least one supply tank and the at least one supply tank comprises an input for saline water received from the at least one flow control device; at least one ozone generator capable of adding ozone to the saline water between the at least one supply tank and the at least one flow control device; at least one Venturi injector comprising an input for saline water received from the at least one supply tank, an input for ozone received from the at least one ozone generator, and at least one output for saline water to the at least one flow control device; at least one receptacle comprising an input for saline water received from the at least one flow control device, wherein the at least one flow control device diverts saline water to the at least one receptacle and prevents return of saline water from the at least one receptacle; and connections providing fluid communication among the at least one receiving tank, the at least one microfilter, the at least one surge tank, the at least one ultrafilter, the at least one supply tank, the at least one flow control device, the at least one ozone generator, the at least one Venturi injector and the at least one receptacle.

Another object of the present invention is a method for sterilizing a liquid medium such as saline water.

An additional aspect of this invention is directed to a method comprising filtering the liquid medium using at least one first filter; filtering the liquid medium using at least one second filter after filtering the liquid medium using the at least one first filter; and supplying at least a portion of the liquid medium to at least one receptacle through at least one flow control device after filtering the liquid medium using the at least one second filter.

An additional aspect of this invention is directed to a method further comprising receiving the liquid medium in at least one receiving tank before filtering the liquid medium using the at least one first filter; receiving the liquid medium in at least one surge tank after filtering the liquid medium using the at least one first filter and before filtering the liquid medium using the at least one second filter; receiving the liquid medium in at least one supply tank after filtering the liquid medium using the at least one second filter and before supplying at least a portion of the liquid medium to the at least one receptacle through the at least one flow control device; and receiving a remaining portion of the liquid medium in the at least one supply tank after supplying at least a portion of the liquid medium to the at least one receptacle through the at least one flow control device.

An additional aspect of this invention is directed to a method further comprising ozonating at least a portion of the liquid medium using at least one ozone generator after filtering the liquid medium using the at least one second filter and before supplying at least a portion of the liquid medium to the at least one receptacle through the at least one flow control device.

An additional aspect of this invention is directed to a method further comprising ozonating the liquid medium to a TRO concentration of at least about 5 milligrams per liter, wherein the liquid medium is saline water, the at least one first filter is a microfilter, the at least one second filter is an ultrafilter and the at least one receptacle is a photobioreactor.

An additional aspect of this invention is directed to a method further comprising testing for growth of microorganisms in the liquid medium that has been filtered using the at least one first filter, filtered using the at least one second filter, and ozonated to a TRO concentration of at least about 5 milligrams per liter, wherein no growth of microorganisms occurs in the liquid medium after about 14 days.

An additional aspect of this invention is directed to a method further comprising receiving the liquid medium in at least one receiving tank before filtering the liquid medium using the at least one first filter; receiving the liquid medium in at least one surge tank after filtering the liquid medium using the at least one first filter and before filtering the liquid medium using the at least one second filter; receiving the liquid medium in at least one supply tank after filtering the liquid medium using the at least one second filter and before ozonating at least a portion of the liquid medium using the at least one ozone generator; receiving a remaining portion of the liquid medium in the at least one supply tank after supplying at least a portion of the liquid medium to the at least one receptacle through the at least one flow control device; and destroying ozone received from the at least one supply tank using at least one ozone destruct device.

An additional aspect of this invention is directed to a method wherein the liquid medium is saline water, the at least one first filter is a microfilter, the at least one second filter is an ultrafilter and the at least one receptacle is a photobioreactor.

An additional aspect of this invention is directed to a method further comprising ozonating the liquid medium to a TRO concentration of at least about 5 milligrams per liter.

An additional aspect of this invention is directed to a method further comprising ozonating the liquid medium to a TRO concentration of at least about 10 milligrams per liter.

An additional aspect of this invention is directed to a method further comprising testing for growth of microorganisms in the liquid medium that has been filtered using the at least one first filter, filtered using the at least one second filter, and ozonated to a TRO concentration of at least about 10 milligrams per liter, wherein no growth of microorganisms occurs in the liquid medium after about 14 days.

The foregoing and other features and advantages of the invention will become further apparent from the following detailed description of the presently preferred embodiments, read in conjunction with the accompanying drawings. The detailed description and drawings are merely illustrative of the invention, rather than limiting the scope of the invention being defined by the appended claims and equivalents thereof.

BRIEF DESCRIPTION OF THE SEVERAL VIEWS OF THE DRAWING

Embodiments of the invention will be described below with reference to the following figures.

DETAILED DESCRIPTION

Figure 1:
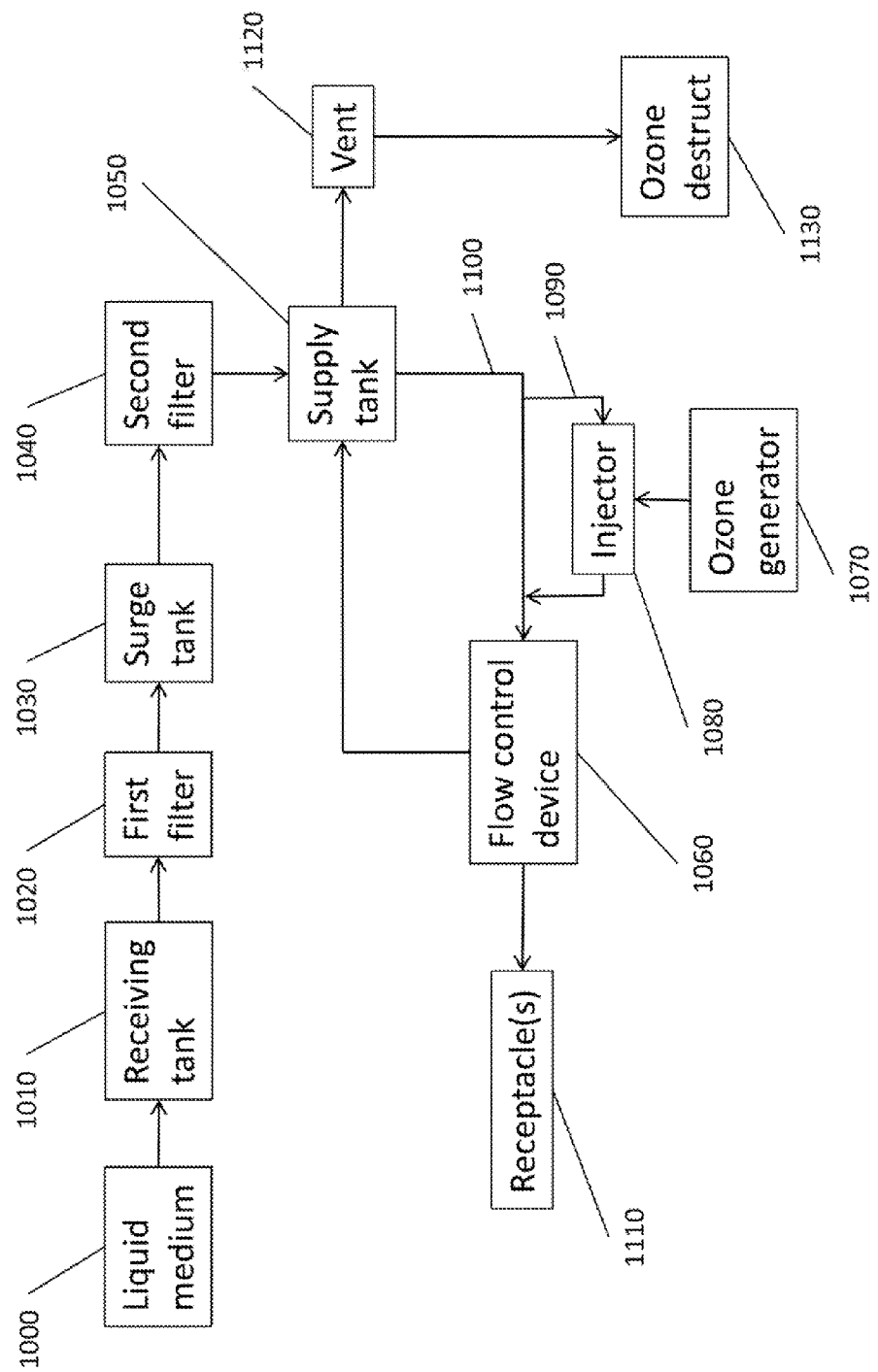
FIG. 1 shows a schematic or flowchart of a system or method according to the present invention.

As used herein, the term "sterilize" or "sterilization" means the elimination of substantially all microorganisms, including transmissible agents (such as fungi, bacteria, viruses and spore forms) contained in a liquid medium.

As used herein, the term "liquid medium" means liquid such as saline water from seawater or groundwater, or fresh water.

As used herein, the term "growth medium" means liquid medium that contains nutrients or other growth agents suitable for supporting the growth of microorganisms.

As used herein, the term "saline water" means water that contains dissolved salts at a concentration of from about 1,000 ppm to about 35,000 ppm.

As used herein, the term "seawater" means saline water from a sea or ocean.

As used herein, the term "groundwater" means water located beneath the earth's surface in soil pore spaces and in the fractures of rock formations, such as in an aquifer.

As used herein, the term "microfilter" means a filter membrane with pore size of about 0.1 to about 10 microns, or micrometers.

As used herein, the term "ultrafilter" means a filter membrane with pore size of about 0.01 to about 0.1 microns, or micrometers.

As used herein, the term "ozonation" means a treatment method that destroys bacteria and other microorganisms in a liquid medium through an infusion of ozone, which is a gas produced by subjecting oxygen molecules to high electrical voltage. In saline water, ozone oxidizes chloride, bromide and iodide. In seawater, which contains approximately 67 milligrams per liter of bromide, ozone oxidizes bromide into bromine, specifically hypobromous acid and hypobromite ion.

As used herein, the term "flow control device" means a valve or any other similar apparatus understood by one of ordinary skill in the art to be suitable for controlling, for example, rate, dispersion or distribution of flow of a liquid or fluid medium.

As used herein, the term "Venturi injector" means a differential pressure injector, optionally with internal mixing vanes.

As used herein, the term "fluid communication" means a connection that permits the passage of liquids or gases.

As used herein, the term "photobioreactor" means a device or system used to support a biologically active environment for the cultivation of photosynthetic microorganisms.

As used herein, the term "total residual oxidant concentration" or "TRO concentration" means the concentration of oxidizing agents in a liquid medium.

As used herein, the term "oxidizing agent", "oxidant" or "oxidizer" means the element or compound in an oxidation-reduction (redox) reaction that accepts an electron from another species, and is thereby reduced. In saline water, oxidizing agents may be, for example, chlorine, bromine or iodine.

As used herein, the term "downstream" means of or pertaining to the latter part of a system or process flow.

As used herein, the term "about" means approximately, in the region of, roughly, or around. When the term "about" is used in conjunction with a numerical value or range, it modifies that value or range by extending the boundaries above and below the numerical value(s) set forth. In general, the term "about" is used herein to modify the numerical value(s) above and below the stated value(s) within a confidence interval of 90% or 95%.

The present invention relates to systems and methods for sterilizing liquid media such as saline water from seawater or groundwater using filtration and ozonation. These and other aspects of the present invention significantly benefit the operation of, for example, photobioreactors used to cultivate genetically enhanced microorganisms that make products such as ethanol or other biofuels through photosynthesis. After being sterilized using systems and methods of the present invention, a liquid medium is free of microorganisms that may outcompete the genetically enhanced microorganisms and/or consume product, and is suitable to be added to a culture of genetically enhanced microorganisms contained in a closed photobioreactor.

As shown in FIG. 1, a supply 1000 of a liquid medium such as saline water from seawater or groundwater enters a system or method of the present invention. The liquid medium successively flows downstream into a receiving tank 1010, through a first filter 1020, into a surge tank 1030, through a second filter 1040 and into a supply tank 1050.

In some embodiments, the first filter 1020 or second filter 1040 is a microfilter. In some embodiments, the first filter 1020 or second filter 1040 is an ultrafilter.

In some embodiments, the liquid medium flows downstream from the supply tank 1050 through a flow control device 1060. In some embodiments, all or a portion of the liquid medium is in fluid communication with an ozone generator 1070 downstream from the supply tank 1050 and upstream from the flow control device 1060. In some embodiments, ozone generated by the ozone generator 1070 is added through a Venturi injector 1080 into a slipstream 1090 of liquid medium that is drawn from a main flow 1100 of liquid medium downstream from the supply tank 1050 and upstream from the flow control device 1060.

In some embodiments, all or a portion of liquid medium flowing through the flow control device 1060 may be supplied downstream to a receptacle 1110 such as a photobioreactor or a storage tank, with any remaining portion of liquid medium recirculated to the supply tank 1050. In some embodiments, the liquid medium flows through the flow control device 1060 and then to the supply tank 1050, with no diversion of liquid medium to receptacles 1110.

In some embodiments, the flow control device 1060 incorporates a one-way valve or other suitable apparatus that is capable of dispersing liquid medium to both the supply tank 1050 and the receptacle 1110, while preventing reverse flow of liquid medium from the receptacle 1110.

In some embodiments, a system or method of the present invention incorporates a vent 1120 that allows gas to enter or leave. In some embodiments, the vent 1120 is in fluid communication with the supply tank 1050 and enables gas to enter or leave the supply tank 1050 in response to decreases or increases in the volume of liquid medium in the supply tank 1050, in order to maintain pressure within a safe operating range and prevent over pressurization of the supply tank 1050 when filling or collapse of the supply tank 1050 when emptying. In some embodiments, the vent 1120 incorporates microfilters or ultrafilters, through which gas entering or leaving the supply tank 1050 flows. In some embodiments, gas that leaves the supply tank 1050 through the vent 1120 flows to an ozone destruct device 1130, which destroys ozone before the gas is released to the atmosphere.

Without wishing to be bound by theory, a system or method of the present invention sterilizes liquid media by removing microorganisms and suspended particles using the first filter 1020 and second filter 1040, and killing microorganisms through ozonation. Filtration reduces the load of microorganisms in the liquid medium and thereby reduces the degree of ozonation needed to kill microorganisms in the liquid medium. Filtration also reduces total organic carbon present in the liquid medium, thereby reducing the amount of ozone that is diverted to oxidizing carbon instead of killing microorganisms. Ultrafiltration removes spore-forming organisms that have high kill thresholds with ozonation. Ozonation remediates microorganisms downstream from filtration and reduces the load of microorganisms in the liquid medium by increasing TRO concentration in the liquid medium.

Ozonation can be used in a system or method of the present invention to increase the TRO concentration in filtered liquid medium above a preselected minimum value that sterilizes the liquid medium. In some embodiments, the liquid medium is ozonated to a TRO concentration of about 10 milligrams chlorine per liter before the liquid medium is supplied to a receptacle such as a photobioreactor. In some embodiments, the liquid medium is ozonated to a TRO concentration of about 5 milligrams chlorine per liter before the liquid medium is supplied to a receptacle such as a photobioreactor. One of ordinary skill in the art will understand that units of milligrams chlorine per liter may be converted to units of milligrams bromine per liter, for example, according to the ratio of the atomic masses or molar masses of the elements.

The supply tank 1050, ozone generator 1070 and flow control device 1060 of a system of the present invention comprise a flow loop. Liquid medium that has been filtered and ozonated can be recirculated in the flow loop continually and withdrawn from the flow loop when supply to a photobioreactor or other receptacle 1110 is needed. The ozone generator 1070 can be selectively operated in a system or method of the present invention to achieve and maintain TRO concentration in the liquid medium in the flow loop at or above a preselected minimum value, and thereby maintain sterility of the liquid medium in the flow loop. Recirculation in the flow loop of liquid medium that has been filtered and ozonated may also help to maintain sterility of the fluid connections.

In some embodiments, liquid medium in the supply tank 1050 is recirculated to improve mixing of the liquid medium and facilitate even distribution of oxidants in the liquid medium.

The receiving tank 1010, surge tank 1030 and supply tank 1050 provide a system or method of the present invention with capability to store large volumes of sterilized liquid medium and meet high surge demand when supplying the sterilized liquid medium to multiple receptacles 1110.

Figure 2:
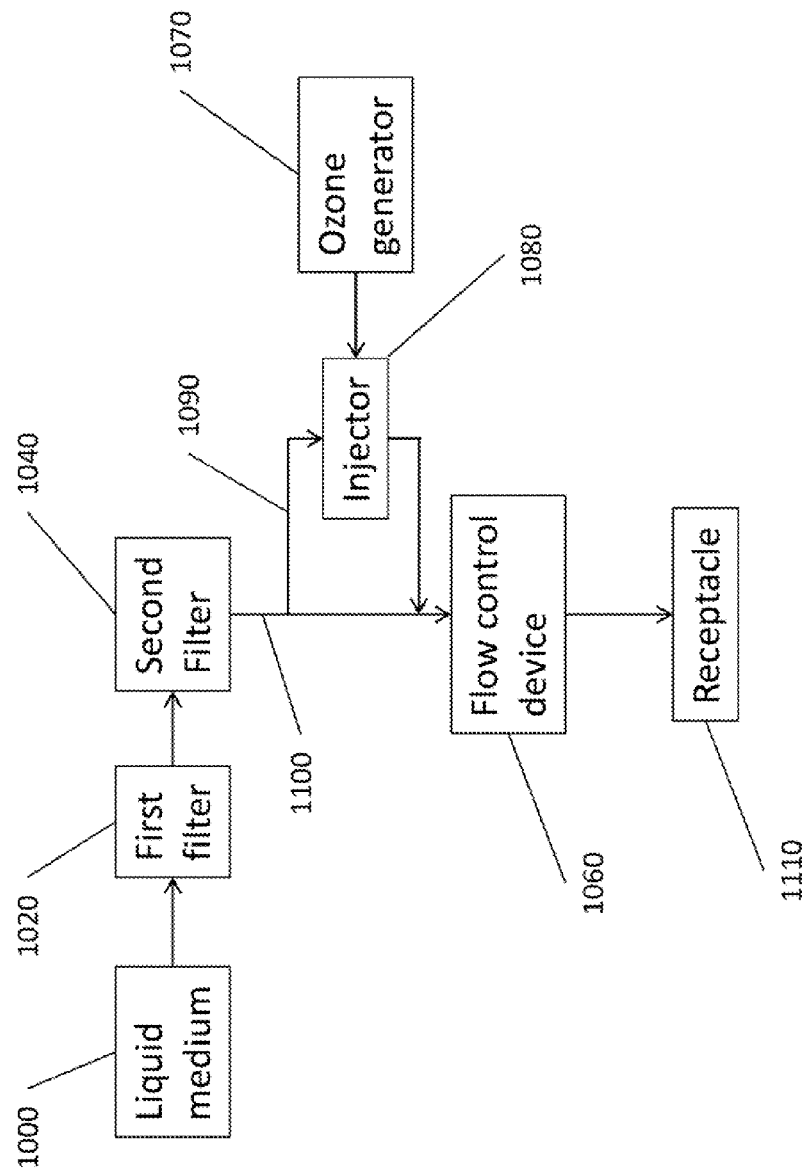
FIG. 2 shows a schematic or flowchart of a system or method according to the present invention.
Figure 3:
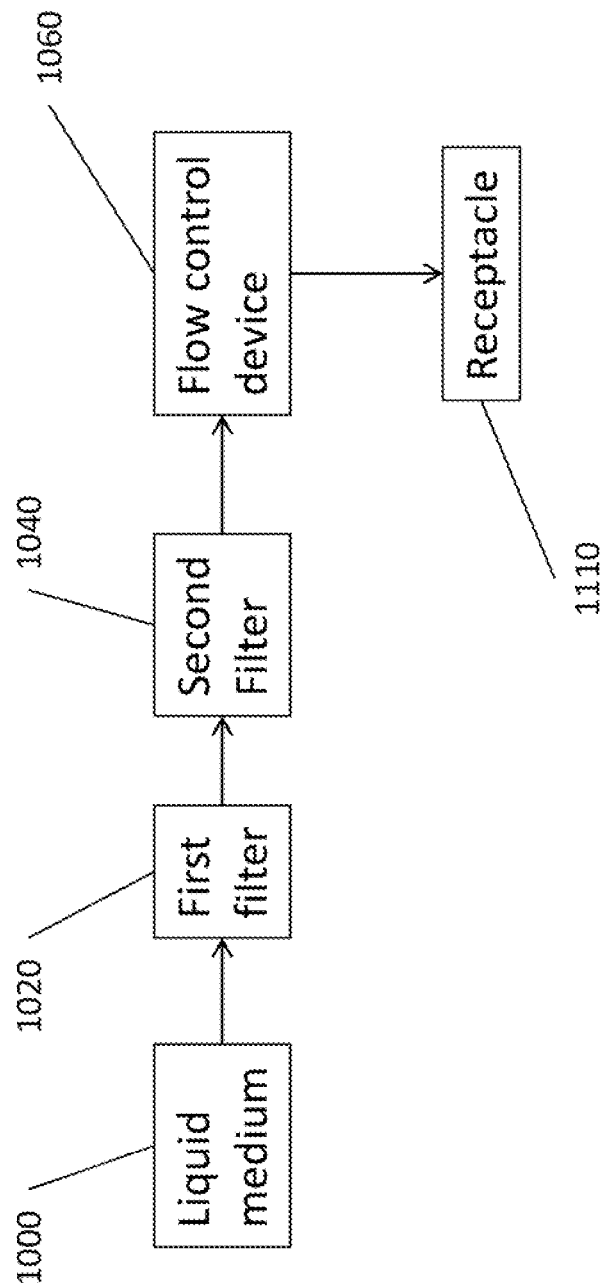
FIG. 3 shows a schematic or flowchart of a system or method according to the present invention.

In some embodiments, storage and surge capacity are not required to supply sterilized liquid medium to receptacles 1110. FIG. 2 shows a system or method of the present invention in which liquid medium flows to a receptacle 1110, such as a photobioreactor, via a first filter 1020, a second filter 1040, an ozone generator 1070 and a flow control device 1060, with no tanks connected among the components of the system or method. In an embodiment as shown in FIG. 2, liquid medium is filtered and ozonated by the system or method of the present invention only when required for imminent or immediate use in the receptacle 1110. In an embodiment as shown in FIG. 3, a system or method of the present invention omits ozonation of the liquid medium by an ozone generator 1070, and the liquid medium is filtered and then supplied to a receptacle 1070.

Example 1

A system and method of the present invention comprise an arrangement of components and method flow as indicated in FIG. 1.

The liquid medium to be sterilized is groundwater drawn from a saline aquifer. The groundwater has substantially the same salinity of 35 grams per liter and bromide concentration of 67 milligrams per liter as found in seawater.

The saline groundwater is pumped into a receiving tank. An example of a suitable, commercially-available receiving tank is a 1500 gallon high-density polyethylene water storage tank from Protectoplas Co.

The saline groundwater is then pumped downstream from the receiving tank through a microfiltration unit, and then into a surge tank. An example of commercially available filters used in a suitable microfiltration unit are a 20 micron cartridge filter (part number P-20-A-30-P) and a 5 micron cartridge filter (part number P-5-A-30-P) from Rosedale Products, Inc. configured in series, with the 20 micron cartridge filter upstream of the 5 micron cartridge filter. An example of a suitable, commercially-available surge tank is a 1500 gallon high-density polyethylene water storage tank from Protectoplas Co.

The saline groundwater is then pumped downstream from the surge tank through an ultrafiltration unit, and then into as many as eight supply tanks. An example of a suitable, commercially-available ultrafiltration unit is a spiral membrane ultrafiltration system with osmonics membranes (part number 817T-HZ20) from GE Osmonics, Inc. An example of a suitable, commercially-available supply tank is a 2500 gallon high-density polyethylene water tank with custom welded flange-style inlets and outlets and gasketed manhole cover from Protectoplas Co.

The saline groundwater is then pumped downstream from the supply tanks to a flow control device. The flow control device is capable of distributing the saline groundwater downstream to one or more receptacles on-demand. The receptacles may be, for example, photobioreactors in which the saline groundwater may be used in culturing microorganisms. The flow control device is also capable of recycling all or any unused portion of the saline groundwater to the supply tanks. An example of a suitable, commercially-available flow control device is a 2 inch schedule 80 PVC ball valve (part number TB1200STE) from Hayward Industries, Inc.

Downstream from the supply tanks and upstream from the flow control device, a slipstream of saline groundwater is drawn from the main liquid flow and passes through a Venturi injector, before rejoining the main liquid flow. An ozone generator is in fluid communication with the Venturi injector and is configured to add ozone to the saline groundwater through the Venturi injector on-demand. An example of a suitable, commercially-available Venturi injector is part number 1584A-PVDF from Mazzei Injector Company, LLC. An example of a suitable, commercially-available ozone generator is a Waterzone ozone injection system (part number WS-300) from Ozone Solutions, Inc.

A vent connected to each supply tank maintains safe operating pressure in the supply tank by allowing ambient air to enter when the supply tank is being drained or be expelled when the supply tank is being filled. The vent incorporates a filter, and is connected in fluid communication to an ozone destruct unit that removes ozone before the air from the supply tank is vented to the atmosphere. An example of a suitable, commercially-available filter for use with the supply tank vent is part number LI3GUATCTC-E from Zenpure Corp. An example of a suitable, commercially-available ozone destruct unit is an ozone destruct (part number ODS-10H) from Ozone Solutions, Inc.

TRO concentration can be measured in saline groundwater drawn from a sample port anywhere in the flow loop between the supply tank and the flow control device. In the present system, the sample port is located between the ozone generator and the flow control device. An example of a suitable, commercially-available instrument for measuring TRO concentration is a single analyte photometer (part number I-2019) from CHEMetrics, Inc.

Examples of suitable, commercially-available pumps used to move the saline groundwater through the system are part number SP15V-T-M215 from Finish Thompson Inc. or any pump with specifications sufficient to circulate water through a specified loop with the pump head constructed of oxidant-resistant materials such as polyvinylidene fluoride or polytetrafluoroethylene.

Examples of suitable, commercially-available piping used to connect the components of the system are constructed of high-density polyethylene, polyvinylidene fluoride, polytetrafluoroethylene or similar materials.

In operation of the exemplary system, saline groundwater is added from the saline aquifer on-demand and at a typical flowrate of 50 gallons per minute. The slipstream of saline groundwater that is diverted from the main liquid flow downstream from the supply tanks and upstream from the flow control device may constitute some portion or all of the main liquid flow, depending on the total volume of liquid to be supplied to receptacles. The ozone generator may be used to inject ozone-containing gas at a concentration of 7% and flowrate of 25 liters per minute into the slipstream of saline groundwater. Under these operating conditions, and when the flow loop between the supply tanks and the flow control device is closed, a TRO concentration of about 10 milligrams chlorine per liter in about 10,000 gallons of saline groundwater can be achieved after about three to about four hours of ozonation. Thereafter, the filtered, ozonated saline groundwater in the closed flow loop may be ozonated for about one hour per day under the same operating conditions in order to maintain the TRO concentration of about 10 milligrams chlorine per liter of saline groundwater.

Example 2

The system and method disclosed in Example 1 provide saline water that is sterile. To confirm sterility, the saline water is tested in growth medium for growth of microorganisms. After 14 days, no growth of microorganisms is seen in the mixture in the container.

A suitable method for testing for growth of microorganisms is to sample 4 liters of saline groundwater with high TRO concentration from the flow loop between the supply tanks and the flow control device into a pre-sterilized container such as a glass bottle. After TRO concentration in the saline groundwater sample decays to about 0 milligrams per milliliter, which will typically occur in about 2 to 5 days, 500 milliliters of growth medium is added to the container.

An example of a suitable, commercially-available growth medium is CC broth. CC broth is prepared by adding 1 gram each of peptone, yeast extract, glucose, sucrose and casein acid hydrolysate to 500 milliliters of filtered saltwater, followed by autoclaving the solution at sterilization settings of 121 degrees Celsius for 30 minutes and then allowing the broth to cool to room temperature. Once the solution has reached room temperature, 20 milliliters of sterile 50×BG11+ sodium thiosulfate anhydrous stock is aseptically added inside a UV-sterilized laminar flow hood with thorough mixing.

Separately, 50×BG11+Sodium Thiosulfate Anhydrous Stock is prepared by combining 125 milliliters $NaNO_3$ (600 g/L), 10 milliliters $K_2HPO_4$ (265 g/L), 1 milliliter $Na_2EDTA\ 2H_2O$ (50 g/L) and 50 milliliters TM stock (1000×) in a 1 liter bottle, then adding 814 milliliters of reverse osmosis water and 4.78 grams of sodium thiosulfate anhydrous, and mixing until dissolved using a stir bar. The mixture is then sterile-filtered by vacuum filtration through a 0.22 micron bottle-top filter and stored at 4 degrees Celsius.

Additionally, the productivity of microorganisms cultured in saline groundwater that is treated using the system and method disclosed in Example 1 is substantially the same as the productivity of microorganisms cultured in saline groundwater that is sterilized in an autoclave. This result further confirms the efficacy of the system and method disclosed in Example 1 in sterilizing the saline groundwater.

One of ordinary skill in the art will appreciate that a system or method of the present invention can incorporate any commercially available filters, ozone generators, tanks, pumps, flow meters and other components that provide substantially similar sterilization performance.

Although the present disclosure has been described in considerable detail with reference to certain embodiments thereof, other embodiments are possible. Therefore, the spirit and scope of the appended claims should not be limited to the description of the embodiments contained herein, and all changes that come within the meaning and range of equivalents are intended to be embraced therein.

What is claimed is:

1. A method for sterilizing a liquid medium, the method comprising:
   (a) filtering the liquid medium using at least one first filter;
   (b) filtering the liquid medium using at least one second filter after filtering the liquid medium using the at least one first filter;
   (c) thereafter ozonating at least a portion of the liquid medium to a Total Residual Oxidant (TRO) concentration of at least about 5 milligrams per liter using at least one ozone generator; and
   (d) thereafter supplying at least a portion of the liquid medium to at least one receptacle through at least one flow control device after filtering the liquid medium using the at least one second filter;
wherein the liquid medium is saline water, the at least one first filter is a microfilter, the at least one second filter is an ultrafilter and the at least one receptacle is a photobioreactor.

2. The method of claim 1 further comprising testing for growth of microorganisms in the liquid medium that has been filtered using the at least one first filter, filtered using the at least one second filter, and ozonated to a TRO concentration of at least about 5 milligrams per liter, wherein no growth of microorganisms occurs in the liquid medium after about 14 days.

3. The method of claim 1 further comprising ozonating the liquid medium to a TRO concentration of at least about 10 milligrams per liter.

4. The method of claim 1, further comprising: in (a), receiving the liquid medium in at least one receiving tank before filtering the liquid medium using the at least one first filter; in (b), receiving the liquid medium in at least one surge tank after filtering the liquid medium using the at least one first filter and before filtering the liquid medium using the at least one second filter; in (c), receiving the liquid medium in at least one supply tank after filtering the liquid medium using the at least one second filter and before ozonating at least a portion of the liquid medium using the at least one ozone generator; in (d), receiving a remaining portion of the liquid medium in at least one supply tank after supplying at least a portion of the liquid medium to the at least one receptacle through the at least one flow control device; and (e) destroying ozone received from the at least one supply tank using at least one ozone destruct device.

5. The method of claim 4 further comprising ozonating the liquid medium to a TRO concentration of at least about 10 milligrams per liter.

\* \* \* \* \*